(12) United States Patent
Zhong et al.

(10) Patent No.: US 12,531,242 B2
(45) Date of Patent: Jan. 20, 2026

(54) DOPED LITHIUM IRON PHOSPHATE ENCAPSULATED IN LIGAND, AND PREPARATION METHOD THEREFOR AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Yingsheng Zhong, Guangdong (CN); Haijun Yu, Guangdong (CN); Yinghao Xie, Guangdong (CN); Aixia Li, Guangdong (CN); Bo Li, Guangdong (CN); Changdong Li, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 104 days.

(21) Appl. No.: 18/289,022

(22) PCT Filed: Aug. 26, 2022

(86) PCT No.: PCT/CN2022/115293
§ 371 (c)(1),
(2) Date: Oct. 31, 2023

(87) PCT Pub. No.: WO2023/124161
PCT Pub. Date: Jul. 6, 2023

(65) Prior Publication Data
US 2024/0222626 A1    Jul. 4, 2024

(30) Foreign Application Priority Data

Dec. 29, 2021    (CN) .......................... 202111634305.4

(51) Int. Cl.
*H01M 4/58*    (2010.01)
*C01B 25/45*    (2006.01)

(52) U.S. Cl.
CPC ........... *H01M 4/5825* (2013.01); *C01B 25/45* (2013.01); *C01P 2002/52* (2013.01);
(Continued)

(58) Field of Classification Search
CPC .. H01M 4/5825; C01B 25/45; C01P 2002/52; C01P 2004/03; C01P 2004/04; C01P 2006/40
See application file for complete search history.

(56) References Cited

U.S. PATENT DOCUMENTS

| 10,305,100 B2 | 5/2019 | Kim et al. |
| 2013/0071753 A1 | 3/2013 | Kim et al. |

FOREIGN PATENT DOCUMENTS

| CN | 103367746 A | 10/2013 | |
| CN | 108199041 A * | 6/2018 | ........... C01B 25/375 |

(Continued)

OTHER PUBLICATIONS

CN 109360967 A translation. (Year: 2019).*

(Continued)

*Primary Examiner* — Angela C Brown-Pettigrew
*Assistant Examiner* — Jiajia Janie Cai
(74) *Attorney, Agent, or Firm* — Westbridge IP LLC

(57) ABSTRACT

A ligand-coated doped lithium iron phosphate, wherein, a general formula of the ligand-coated doped lithium iron phosphate is $LiFePO_4@Mn\text{-}T\text{-}C/N$, wherein T is at least one of zinc, nickel, copper, iron, cobalt, gallium, or chromium.

7 Claims, 2 Drawing Sheets

(52) U.S. Cl.
CPC ...... *C01P 2004/03* (2013.01); *C01P 2004/04* (2013.01); *C01P 2006/40* (2013.01)

(56) References Cited

FOREIGN PATENT DOCUMENTS

| CN | 109244391 | A | * | 1/2019 | ............ | H01M 4/625 |
|---|---|---|---|---|---|---|
| CN | 109360967 | A | * | 2/2019 | ............ | H01M 4/366 |
| CN | 109524658 | A | | 3/2019 | | |
| CN | 111224103 | A | | 6/2020 | | |
| CN | 111430687 | A | | 7/2020 | | |
| CN | 111613786 | A | * | 9/2020 | ............ | H01M 4/625 |
| CN | 111668448 | A | | 9/2020 | | |
| CN | 114373911 | A | | 4/2022 | | |
| CN | 114373911 | B | | 2/2025 | | |
| KR | 10-2013-0030102 | A | | 3/2013 | | |

OTHER PUBLICATIONS

CN 111613786 A translation. (Year: 2020).*
CN 108199041 A translation. (Year: 2018).*
CN 109244391 A translation. (Year: 2019).*
International Search Report and Written Opinion of the International Searching Authority issued by the China National Intellectual Property Administration for International Patent Application No. PCT/CN2022/115293, mailed on Oct. 31, 2022, with an English translation.
First Office Action issued by the State Intellectual Property Office of People's Republic of China for Chinese Patent Application No. 202111634305.4, dated Oct. 24, 2024, with an English translation.
Notification to Grant Patent Right for Invention issued by the State Intellectual Property Office of People's Republic of China for Chinese Patent Application No. 202111634305.4, dated Dec. 20, 2024, with an English translation.

* cited by examiner

DOPED LITHIUM IRON PHOSPHATE ENCAPSULATED IN LIGAND, AND PREPARATION METHOD THEREFOR AND USE THEREOF

CROSS-REFERENCE TO RELATED APPLICATION

This application is a national stage filing under 35 U.S.C. § 371 of international application number PCT/CN2022/115293, filed Aug. 26, 2022, which claims priority to Chinese patent application No. 202111634305.4, filed Dec. 29, 2021. The contents of these applications are incorporated herein by reference in their entirety.

TECHNICAL FIELD

The present invention belongs to the technical field of lithium ion batteries, and more particularly, relates to a ligand-coated doped lithium iron phosphate, a preparation method therefor, and the application thereof.

BACKGROUND

Currently, relatively mature positive electrode materials for lithium batteries mainly contain transition metal (lithium cobalt oxides, lithium manganate, olivine-type structures, etc.), and fluorine and chlorine compounds. Lithium cobalt oxide positive electrode materials are the most successful business model, initially commercialized by Sony Corporation. However, the main limitation thereof lies in an excessively high cost, together with a low thermal stability, which easily causes spontaneous combustion, e.g. spontaneous combustions and explosions in some brands of mobile phones and electric vehicles. Lithium manganate is relatively low in toxicity and inexpensive and has a particularly low cycle performance, which also limits further commercialization of lithium manganate. Metal chlorides and fluorides have been extensively studied due to their higher theoretical specific capacities and capacities. However, metal chlorides and fluorides often suffer from problems such as poor electrical conductivity, volume expansion, and unwanted side reactions.

The material lithium iron phosphate (LFP), which has an olivine-type structure and is inexpensive, extremely stable, non-toxic and environmentally friendly, is particularly suitable for applications in power lithium batteries. However, the charge-discharge efficiency thereof is unsatisfactory. Given its excellent properties, the modification and improvement of the charge-discharge efficiency of lithium iron phosphate is worth studying. In general, single modification experiments are often limited by conditions, and the modification effects are not good, especially for lithium iron phosphate positive electrode materials.

SUMMARY

The present invention aims to solve at least one of the above-mentioned technical problems existing in the prior art. To this end, the present invention proposes a ligand-coated doped lithium iron phosphate, a preparation method therefor, and the application thereof. The ligand-coated doped lithium iron phosphate has excellent structural stability and electrochemical performance.

To achieve the above object, the present invention uses the following technical solutions:

Provided is a ligand-coated doped lithium iron phosphate with a general formula of $LiFePO_4@Mn\text{-}T\text{-}C/N$, wherein T is at least one of zinc, nickel, copper, iron, cobalt, zirconium, aluminum, gallium, or chromium.

Preferably, T is at least one of zinc, nickel, copper, cobalt, zirconium, or gallium.

Preferably, Mn-T-C/N is Mn-T supported on C/N. C/N is a carbon microsphere conductor.

Preferably, the ligand-coated doped lithium iron phosphate is one of $LiFePO_4@Mn$—Zn/Ga—C/N, $LiFePO_4@Mn$—Cu/Co/Zr—C/N, $LiFePO_4@Mn$—Zn/Co—C/N, $LiFePO_4@Mn$—Co/Cu—C/N, $LiFePO_4@Mn$—Zr/Cu—C/N, $LiFePO_4@Mn$—Zr/Cu/Co—C/N, or $LiFePO_4@Mn$—Zn/Cu/Co—C/N.

Provided is a method for preparing a ligand-coated doped lithium iron phosphate, wherein the preparation method is used for preparing the above-mentioned coated lithium iron phosphate.

In particular, the method for preparing a ligand-coated doped lithium iron phosphate comprises the following steps:

mixing a phosphate fertilizer, an iron source, and a regulator, heating the mixture for a reaction, carrying out solid-liquid separation, and taking a solid phase for first calcination to obtain iron phosphate;

mixing the iron phosphate with a lithium source, a carbon source, and a carbon microsphere conductor, stirring the mixture, and subjecting the mixture to second calcination to obtain carbon-microsphere-conductor-doped lithium iron phosphate; and mixing the carbon-microsphere-conductor-doped lithium iron phosphate with a sulfite and a liquid phase ligand, stirring the mixture, and subjecting the mixture to aging, cross-linking, and third calcination to obtain the ligand-coated doped lithium iron phosphate, wherein the carbon microsphere conductor comprises carbon nanospheres, 1,6-bis(dimethylamino)hexane, a manganese source, a T source, methacrylamide, and a dispersant; and the T source comprises at least one of soluble chloride salts, nitrates, or sulfates of zinc, nickel, copper, iron, cobalt, zirconium, aluminum, gallium, or chromium.

Preferably, the molar ratio of P in the phosphate fertilizer to Fe in the iron source to Li in the lithium source to C in the carbon source is 1:(0.95-1.10):(0.95-1.15):(0.05-0.30).

Preferably, the phosphate fertilizer is at least one of ammonium dihydrogen phosphate, diammonium hydrogen phosphate, ammonium phosphate, potassium dihydrogen phosphate, dipotassium hydrogen phosphate, potassium phosphate, or potassium phosphite.

Further preferably, the purity of the phosphate fertilizer reaches battery grade.

More preferably, in the phosphate fertilizer, Ca≤50 ppm, Mg≤50 ppm, zinc≤50 ppm, potassium≤100 ppm, sodium≤100 ppm, F≤10 ppm, S≤30 ppm, and Cl≤30 ppm.

Preferably, the iron source is at least one of ferric chloride, ferric acetate, ferric nitrate, ferric sulfate, ferric hydroxide, or ferric oxalate.

Preferably, the heated reaction further comprises controlling the pH of the reaction system to be less than or equal to 3.0.

Preferably, the regulator is at least one of octadecyltrimethylammonium bromide, cetyltrimethylammonium bromide, tetradecyltrimethylammonium bromide, or dodecyltrimethylammonium bromide.

Preferably, the added amount of the regulator is 0.001-0.010 of the total mass of the phosphate fertilizer and the iron source.

Preferably, the lithium source is at least one of lithium hydroxide, lithium carbonate, lithium chloride, lithium formate, lithium phosphate, lithium oxalate, lithium sulfate, lithium nitrate, or lithium bromide.

Preferably, the carbon source is at least one of maltose powder, corn syrup, bee honey, glucose powder, or starch.

Preferably, the atmosphere of the first calcination is one of $N_2$, Ne, Ar, or Kr.

Preferably, the temperature of the first calcination is 380-950° C., and the time of the first calcination is 4-20 h.

Preferably, the added amount of the carbon microsphere conductor is 0.001-0.05 of the total mass of the iron phosphate and the lithium source.

Preferably, the method for preparing the carbon microsphere conductor comprises the following steps: (1) uniformly mixing carbon nanospheres, a manganese source, a T source, methacrylamide, and a dispersant, and stirring, centrifuging, filtering, and drying the mixture to obtain a composite supported carbon microsphere conductor precursor; and (2) uniformly mixing the composite supported carbon microsphere conductor precursor with 1,6-bis(dimethylamino)hexane and a dispersant and subjecting the mixture to a heat treatment to obtain the carbon microsphere conductor.

Further preferably, the carbon nanospheres, manganese source, T source, methacrylamide, and dispersant are mixed at a solid-to-liquid ratio of (0.5-5) g:(0.1-1) g:(0.1-1) g:(1-5) ml:(5-20) ml.

Further preferably, the heat treatment has a temperature of 300-800° C. and a time of 30-120 min.

Preferably, the manganese source is at least one of manganese chloride, manganese nitrate, or manganese sulfate.

Preferably, the dispersant is at least one of methanol, ethanol, ethylene glycol, glycerol, polyvinyl alcohol, polyethylene glycol, n-butanol, isobutanol, or water.

Preferably, the aging temperature is 95-150° C., and the aging time is 4-12 h.

Preferably, the atmosphere of the second calcination is one of $N_2$, Ne, Ar, or Kr.

Preferably, the temperature of the second calcination is 380-950° C., and the time of the second calcination is 4-20 h.

Preferably, the sulfite is at least one of iron sulfite, sodium sulfite, potassium sulfite, lithium sulfite, or ammonium sulfite.

Preferably, the added amount of the sulfite is 0.001-0.1 of the mass of the lithium iron phosphate, and further preferably, the added amount of the sulfite is 0.003-0.01 of the mass of the lithium iron phosphate.

Preferably, the liquid phase ligand is formed by mixing a ligand and a dispersant at a solid-to-liquid ratio of (0.1-0.5):(2-10) g/ml.

Further preferably, the added amount of the ligand is 0.0001-0.03 of the mass of the lithium iron phosphate.

More preferably, the added amount of the ligand is 0.005-0.01 of the mass of the lithium iron phosphate.

Further preferably, the ligand is at least one of 1,6-bis(1H-imidazol-4-ylformyl)-hexane, 1,2-bis(1H-imidazole-4-carboxamido)ethane, dimethyl 4-hydroxy-(1,1'-biphenyl)-3,5-dicarboxylate, or 1,1',1''-(nitrilotris(benzene-4,1-diyl)) triethanone.

Preferably, the atmosphere of the third calcination is one of $N_2$, Ne, Ar, or Kr.

Preferably, the temperature of the third calcination is 380-950° C., and the time of the third calcination is 4-18 h.

The present invention further provides a battery, comprising the ligand-coated doped lithium iron phosphate.

Compared with the prior art, the present invention has the following beneficial effects:

1. The type of doping for the ligand-coated doped lithium iron phosphate of the present invention refers to doping with a composite supported carbon microsphere conductor. The composite supported carbon microsphere conductor has a particle size that reaches a level of 80-150 nm, and therefore, a stress at a greater intensity can be withstood, thereby reducing the probability of cracking. After being doped with the composite supported carbon microsphere conductor, the spherical lithium iron phosphate leads to easier control of the structural integrity of the material. In addition, it can contribute a considerable specific surface area, and the synergistic effect of various metal ions supported by the carbon microsphere conductor can shorten the migration pathway of electrons inside the material and improve the electrical conductivity of the material. Therefore, doping with the composite supported carbon microsphere conductor can stabilize the stability of the overall structure of the spherical lithium iron phosphate material and improve the electrochemical performance. Upon 50 discharge cycles, compared with those prepared in Comparative Examples 1-3, the lithium iron phosphates prepared in Embodiments 1-6 have higher specific discharge capacities and superior structures, and also correspondingly enhance and improve the cycle performance of a spherical lithium iron phosphate positive electrode material. As for ligand coating for the ligand-coated doped lithium iron phosphate, an Mn-T-C/N framework structure formed by a part of liquid phase ligand with Mn and T will strengthen the spherical lithium iron phosphate.

2. In the preparation method of the present invention, the lithium iron phosphate is mixed with a sulfite and a liquid phase ligand and stirred, and the mixture is subjected to aging, cross-linking, and third calcination. On the one hand, the addition of the sulfite prevents the iron in the spherical lithium iron phosphate from being oxidized, which is conducive to ex situ liquid phase ligand coating. On the other hand, after aging the spherical lithium iron phosphate in the liquid phase ligand, cross-linking with the metals supported by the doping composite supported carbon microsphere conductor may occur; in addition, the doping carbon microsphere conductor in the spherical lithium iron phosphate supports the metals Mn and T, a part of liquid phase ligand will form an Mn-T-C/N framework structure with Mn and T, and the Mn-T-C/N framework structure will enhance the spherical lithium iron phosphate. The coating strategy of coating the spherical lithium iron phosphate positive electrode material with the liquid phase ligand provides a new idea for the modification of a positive electrode material.

3. The composite supported carbon microsphere conductor of the present invention has not only a relatively high electrical conductivity and a high chemical stability, but also a low manufacturing cost and simple synthesis. Therefore, this has a positive impact on the improvement of the spherical lithium iron phosphate positive electrode material and is conducive to further commercial application of the lithium iron phosphate positive electrode material.

DETAILED DESCRIPTION

Figure 1:
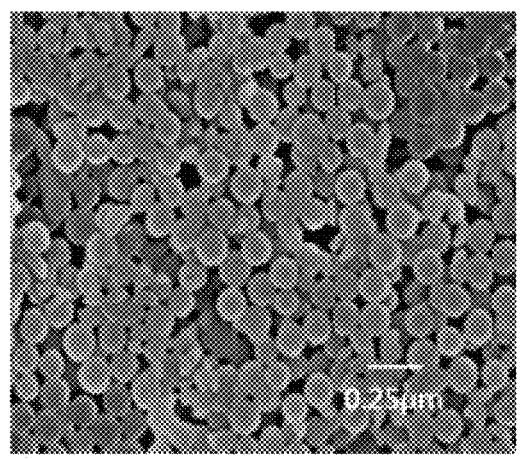
FIG. 1 is an SEM image of a carbon microsphere conductor prepared in Embodiment 4 of the present invention.

The concept of the present invention and the technical effects produced thereby will be clearly and completely described below with reference to the embodiments in order to fully understand the objects, characteristics and effects of the present invention. Obviously, the described embodiments are only some, rather than all, of the embodiments of the present invention. Other embodiments obtained by those skilled in the art based on the embodiments of the present invention without involving any inventive effort all fall within the scope of protection of the present invention.

Embodiment 1

The ligand-coated doped lithium iron phosphate of this embodiment has a chemical formula of $LifePO_4@Mn-Zn/Ga-C/N$.

The specific steps of the preparation method for the ligand-coated doped lithium iron phosphate of this embodiment are as follows:

(1) 100 mL of 0.74 mol/L ammonium dihydrogen phosphate and 70 mL of 0.50 mol/L ferric sulfate are dropwise added to a reaction kettle with a capacity of 500 mL and stirred, during which 20 mL of a solution containing 0.20 g of octadecyltrimethylammonium chloride is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;

(2) 2.5 g of carbon nanospheres, 0.05 g of manganese sulfate, 0.05 g of zinc chloride, 0.05 g of gallium sulfate, 1.2 g of methacryloyl, and 5 mL of deionized water are uniformly mixed and stirred, and the mixture is centrifuged, filtered, and sent to a drying box for drying at 150° C. for 5 h to obtain 3.3 g of a manganese-zinc-gallium-based composite supported carbon microsphere conductor precursor;

(3) 3.3 g of the manganese-zinc-gallium-based composite supported carbon microsphere conductor precursor, 0.5 g of 1,6-bis(dimethylamino)hexane, and 7 mL of ethanol are uniformly mixed, and the mixture is sent to a drying box for a treatment in the filler Ar at 420° C. for 35 min to obtain 3.7 g of a carbon microsphere conductor;

(4) 11.7 g of the spherical iron phosphate obtained in step (1), 0.1 g of the carbon microsphere conductor, 1.8 g of lithium hydroxide, 0.3 g of corn syrup, and 20 mL of polyethylene glycol are mixed and stirred, the mixture is further sent to a heating box for drying, and after heating in the filler Ar at 650° C. for 8 h, 12.3 g of a carbon-microsphere-conductor-doped spherical lithium iron phosphate is obtained; and (5) 0.15 g of ammonium sulfite, 12.3 g of the carbon-microsphere-conductor-doped spherical lithium iron phosphate, and 15 mL of polyethylene glycol (containing 0.35 g of 1,6-bis(1H-imidazol-4-ylformyl)-hexane) are added to a reaction kettle and stirred, the mixture is aged at 95° C. for 10 h, further heated in the filler Ar at 450° C. for 7.5 h, and after crushing, washing, drying, and demagnetization, the ligand-coated carbon-microsphere-conductor-doped lithium iron phosphate $LiFePO_4@Mn-Zn/Ga-C/N$ is obtained.

Embodiment 2

The ligand-coated doped lithium iron phosphate of this embodiment has a chemical formula of $LifePO_4@Mn-Zn/Co-C/N$.

The specific steps of the preparation method for the ligand-coated doped lithium iron phosphate of this embodiment are as follows:

(1) 110 mL of 0.74 mol/L ammonium dihydrogen phosphate and 73 mL of 0.50 mol/L ferric sulfate are dropwise added to a high-temperature-resistant reaction kettle with a capacity of 500 mL and stirred, during which 20 mL of a solution containing 0.20 g of octadecyltrimethylammonium chloride is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;

(2) 2.5 g of carbon nanospheres, 0.05 g of manganese sulfate, 0.05 g of zinc chloride, 0.05 g of cobalt sulfate, 1.0 g of methacryloyl, and 5 mL of deionized water are uniformly mixed and stirred, and the mixture is centrifuged, filtered, and sent to a drying box for drying at 150° ° C. for 5 h to obtain 3.3 g of a manganese-zinc-cobalt-based composite supported carbon microsphere conductor precursor;

(3) 3.3 g of the manganese-zinc-cobalt-based composite supported carbon microsphere conductor precursor, 0.5 g of 1,6-bis(dimethylamino)hexane, and 7 mL of ethanol are uniformly mixed, and the mixture is sent to a drying box for a treatment in the filler Ar at 420° C. for 35 min to obtain 3.7 g of a carbon microsphere conductor;

(4) 11.7 g of the spherical iron phosphate obtained in step (1), 0.15 g of the carbon microsphere conductor, 1.8 g of lithium hydroxide, 0.3 g of corn syrup, and 20 mL of polyethylene glycol are mixed and stirred, the mixture is further sent to a heating box for drying, and after heating in the filler Ar at 650° C. for 8 h, 12.4 g of a carbon-microsphere-conductor-doped spherical lithium iron phosphate is obtained; and (5) 0.18 g of ammonium sulfite, 12.4 g of the carbon-microsphere-conductor-doped spherical lithium iron phosphate, and 18 mL of polyethylene glycol (containing 0.4 g of 1,6-bis(1H-imidazol-4-ylformyl)-hexane) are added to a reaction kettle and stirred, the mixture is aged at 95° ° C. for 10 h and further heated in the filler Ar at 540° C. for 6 h, and after crushing, washing, drying, and demagnetization, the ligand-coated carbon-microsphere-conductor-doped lithium iron phosphate $LiFePO_4@Mn-Zn/Co-C/N$ is obtained.

Embodiment 3

The ligand-coated doped lithium iron phosphate of this embodiment has a chemical formula of LifePO$_4$@Mn—Co/Cu—C/N.

The specific steps of the preparation method for the ligand-coated doped lithium iron phosphate of this embodiment are as follows:

(1) 115 mL of 0.74 mol/L ammonium dihydrogen phosphate and 75 mL of 0.50 mol/L ferric sulfate are dropwise added to a high-temperature-resistant reaction kettle with a capacity of 500 mL and stirred, during which 25 mL of a solution containing 0.20 g of octadecyltrimethylammonium chloride is added dropwise, an appropriate amount of phosphoric acid is added to control the pH of the solution to be 2.4, the reaction kettle is sent to a heating box for heating in the filler Ar at 585° C. for 6 h, and after standing overnight, the product is filtered, washed, and dried to obtain 11.9 g of spherical iron phosphate;

(2) 2.5 g of carbon nanospheres, 0.06 g of manganese sulfate, 0.06 g of zinc chloride, 0.04 g of gallium sulfate, 1.5 g of methacryloyl, and 9 mL of deionized water are uniformly mixed and stirred, and the mixture is centrifuged, filtered, and sent to a drying box for drying at 150° C. for 5 h to obtain 3.5 g of a manganese-cobalt-copper-based composite supported carbon microsphere conductor precursor;

(3) 3.5 g of the manganese-cobalt-copper-based composite supported carbon microsphere conductor precursor, 0.65 g of 1,6-bis(dimethylamino)hexane, and 7 mL of ethanol are uniformly mixed, and the mixture is sent to a drying box for a treatment in the filler Ar at 420° C. for 35 min to obtain 3.9 g of a carbon microsphere conductor;

(4) 11.9 g of the spherical iron phosphate obtained in step (1), 0.2 g of the carbon microsphere conductor, 1.9 g of lithium hydroxide, 0.3 g of corn syrup, and 22 mL of polyethylene glycol are mixed and stirred, the mixture is further sent to a heating box for drying, and after heating in the filler Ar at 650° C. for 8 h, 12.3 g of a carbon-microsphere-conductor-doped spherical lithium iron phosphate is obtained; and (5) 0.2 g of ammonium sulfite, 12.3 g of the carbon-microsphere-conductor-doped spherical lithium iron phosphate, and 20 mL of polyethylene glycol (containing 0.5 g of 1,2-bis(1H-imidazole-4-carboxamido)ethane) are added to a reaction kettle and stirred, the mixture is aged at 120° ° C. for 9 h and further heated in the filler Ar at 590° C. for 5 h, and after crushing, washing, drying, and demagnetization, the ligand-coated carbon-microsphere-conductor-doped lithium iron phosphate LiFePO$_4$@Mn—Co/Cu—C/N is obtained.

Embodiment 4

The ligand-coated doped lithium iron phosphate of this embodiment has a chemical formula of LifePO$_4$@Mn—Zr/Cu—C/N.

The specific steps of the preparation method for the ligand-coated doped lithium iron phosphate of this embodiment are as follows:

(1) 110 mL of 0.74 mol/L potassium dihydrogen phosphate and 70 mL of 0.53 mol/L ferric nitrate are dropwise added to a high-temperature-resistant reaction kettle with a capacity of 500 mL and stirred, during which 20 mL of a solution containing 0.20 g of cetyltrimethylammonium bromide is added dropwise, an appropriate amount of phosphoric acid is added to control the pH of the solution to be 2.6, the reaction kettle is sent to a heating box for heating in the filler Ar at 585° C. for 6 h, and after standing overnight, the product is filtered, washed, and dried to obtain 11.8 g of spherical iron phosphate;

(2) 2.5 g of carbon nanospheres, 0.10 g of manganese sulfate, 0.05 g of zirconium sulfate, 0.08 g of copper chloride, 1.0 g of methacryloyl, and 6 mL of deionized water are uniformly mixed and stirred, and the mixture is centrifuged, filtered, and sent to a drying box for drying at 150° C. for 5 h to obtain 2.9 g of a manganese-zirconium-copper-based composite supported carbon microsphere conductor precursor;

(3) 2.9 g of the manganese-zirconium-copper-based composite supported carbon microsphere conductor precursor, 0.5 g of 1,6-bis(dimethylamino)hexane, and 7 mL of ethanol are uniformly mixed, and the mixture is sent to a drying box for a treatment in the filler Ar at 460° C. for 42 min to obtain 3.3 g of a carbon microsphere conductor;

(4) 11.8 g of the spherical iron phosphate obtained in step (1), 1.85 g of lithium hydroxide, 0.3 g of glucose, 0.2 g of the carbon microsphere conductor, and 20 mL of polyethylene glycol are mixed and stirred, the mixture is further sent to a heating box for drying, and after heating in the filler Ar at 650° C. for 8 h, 12.3 g of a carbon-microsphere-conductor-doped spherical lithium iron phosphate is obtained; and (5) 0.12 g of lithium sulfite, 12.3 g of the carbon-microsphere-conductor-doped spherical lithium iron phosphate, and 12 mL of polyethylene glycol (containing 0.3 g of dimethyl 4-hydroxy-(1,1'-biphenyl)-3,5-dicarboxylate) are added to a reaction kettle and stirred, the mixture is aged at 130° C. for 7 h and further heated in the filler Ar at 650° C. for 4 h, and after crushing, washing, drying, and demagnetization, the ligand-coated carbon-microsphere-conductor-doped lithium iron phosphate LiFePO$_4$@Mn—Zr/Cu—C/N is obtained.

Figure 2:
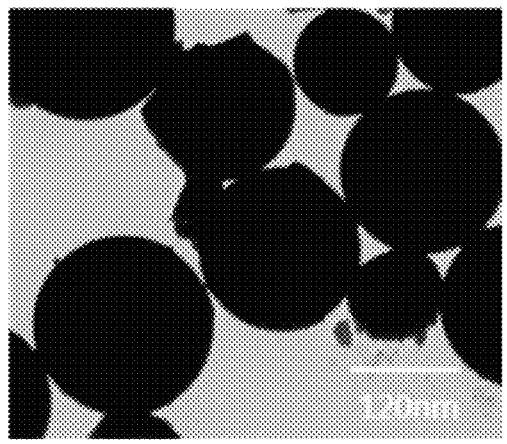
FIG. 2 is a TEM image of the carbon microsphere conductor prepared in Embodiment 4 of the present invention.

FIG. 1 is an SEM image of the carbon microsphere conductor of Embodiment 4 of the present invention; and FIG. 2 is a TEM image of the carbon microsphere conductor of Embodiment 4 of the present invention. With reference FIGS. 1 and 2, the carbon microsphere conductor has a size between 100 nm and 200 nm and is mostly spherical; in addition, the particles are relatively uniform, and a small fraction thereof is incompletely crushed.

Figure 3:
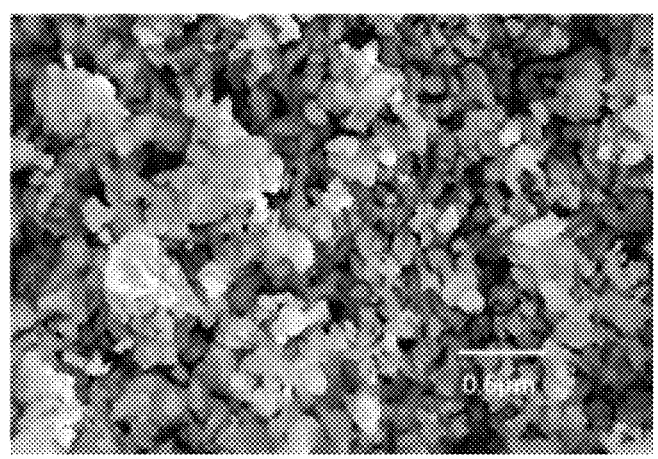
FIG. 3 is an SEM image of a ligand-coated doped lithium iron phosphate prepared in Embodiment 4 of the present invention.

FIG. 3 is an SEM image of the ligand-coated doped lithium iron phosphate of Embodiment 4 of the present invention. It could be concluded from FIG. 3 that the shape of the ligand-coated doped lithium iron phosphate particles is not obvious, many lithium iron phosphate particles are bonded together, the size is 100-300 nm, and the particle diameter is increased.

Embodiment 5

The ligand-coated doped lithium iron phosphate of this embodiment has a chemical formula of LifePO$_4$@Mn—Zr/Cu/Co—C/N.

The specific steps of the preparation method for the ligand-coated doped lithium iron phosphate of this embodiment are as follows:

(1) 100 mL of 0.74 mol/L potassium dihydrogen phosphate and 76 mL of 0.53 mol/L ferric nitrate are dropwise added to a high-temperature-resistant reaction kettle with a capacity of 500 mL and stirred, during which 20 mL of a solution containing 0.20 g of cetyltrimethylammonium bromide is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;

(2) 4.0 g of carbon nanospheres, 0.12 g of manganese sulfate, 0.07 g of zirconium sulfate, 0.12 g of copper chloride, 0.04 g of cobalt sulfate, 1.2 g of methacryloyl, and 12 mL of deionized water are uniformly mixed and stirred, and the mixture is centrifuged, filtered, and sent to a drying box for drying at 150° C. for 5 h to obtain 4.4 g of a manganese-zirconium-copper-cobalt-based composite supported carbon microsphere conductor precursor;

(3) 3.4 g of the manganese-zirconium-copper-cobalt-based composite supported carbon microsphere conductor precursor, 0.6 g of 1,6-bis(dimethylamino)hexane, and 7 mL of ethanol are uniformly mixed, and the mixture is sent to a drying box for a treatment in the filler Ar at 460° C. for 42 min to obtain 3.6 g of a carbon microsphere conductor;

(4) 11.7 g of the spherical iron phosphate obtained in step (1), 1.8 g of lithium hydroxide, 0.35 g of glucose, 0.25 g of the carbon microsphere conductor, and 20 mL of polyethylene glycol are mixed and stirred, the mixture is further sent to a heating box for drying, and after heating in the filler Ar at 650° C. for 8 h, 12.8 g of a carbon-microsphere-conductor-doped spherical lithium iron phosphate is obtained; and (5) 0.15 g of lithium sulfite, 12.8 g of the carbon-microsphere-conductor-doped spherical lithium iron phosphate, and 18 mL of polyethylene glycol (containing 0.35 g of dimethyl 4-hydroxy-(1,1'-biphenyl)-3,5-dicarboxylate) are added to a reaction kettle and stirred, the mixture is aged at 140° C. for 6 h and further heated in the filler Ar at 750° ° C. for 3.5 h, and after crushing, washing, drying, and demagnetization, the ligand-coated carbon-microsphere-conductor-doped lithium iron phosphate LiFePO$_4$@Mn—Zr/Cu/Co—C/N is obtained.

Embodiment 6

The ligand-coated doped lithium iron phosphate of this embodiment has a chemical formula of LiFePO$_4$@Mn—Zn/Cu/Co—C/N.

The specific steps of the preparation method for the ligand-coated doped lithium iron phosphate of this embodiment are as follows:

(1) 120 mL of 0.74 mol/L potassium dihydrogen phosphate and 73 mL of 0.53 mol/L ferric nitrate are dropwise added to a high-temperature-resistant reaction kettle with a capacity of 500 mL and stirred, during which 20 mL of a solution containing 0.20 g of cetyltrimethylammonium bromide is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;

(2) 4.2 g of carbon nanospheres, 0.10 g of manganese sulfate, 0.05 g of zinc sulfate, 0.10 g of copper chloride, 0.08 g of cobalt sulfate, 1.5 g of methacryloyl, and 15 mL of deionized water are uniformly mixed and stirred, and the mixture is centrifuged, filtered, and sent to a drying box for drying at 150° ° C. for 5 h to obtain 4.6 g of a manganese-zirconium-copper-cobalt-based composite supported carbon microsphere conductor precursor;

(3) 2.9 g of the manganese-zinc-copper-cobalt-based composite supported carbon microsphere conductor precursor, 0.5 g of 1,6-bis(dimethylamino)hexane, and 7 mL of ethanol are uniformly mixed, and the mixture is sent to a drying box for a treatment in the filler Ar at 460° C. for 42 min to obtain 3.3 g of a carbon microsphere conductor;

(4) 11.7 g of the spherical iron phosphate obtained in step (1), 1.8 g of lithium hydroxide, 0.3 g of glucose, 0.2 g of the carbon microsphere conductor, and 20 mL of polyethylene glycol are mixed and stirred, the mixture is further sent to a heating box for drying, and after heating in the filler Ar at 650° C. for 8 h, 12.3 g of a carbon-microsphere-conductor-doped spherical lithium iron phosphate is obtained; and (5) 0.18 g of lithium sulfite, 12.1 g of the carbon-microsphere-conductor-doped spherical lithium iron phosphate, and 20 mL of polyethylene glycol (containing 0.45 g of dimethyl 4-hydroxy-(1,1'-biphenyl)-3,5-dicarboxylate) are added to a reaction kettle and stirred, the mixture is aged at 150° C. for 4 h and further heated in the filler Ar at 950° C. for 3 h, and after crushing, washing, drying, and demagnetization, the ligand-coated carbon-microsphere-conductor-doped lithium iron phosphate LiFePO$_4$@Mn—Zn/Cu/Co—C/N is obtained.

Comparative Example 1 (No Doping with Carbon Microsphere Conductor)

The ligand-coated lithium iron phosphate of this comparative example has a chemical formula of LifePO$_4$@—C/N.

The specific steps of the preparation method for the ligand-coated lithium iron phosphate of this comparative example are as follows:

(1) 100 mL of 0.74 mol/L ammonium dihydrogen phosphate and 73 mL of 0.50 mol/L ferric sulfate are dropwise added to a reaction kettle with a capacity of 500 mL and stirred, during which 20 mL of a solution containing 0.20 g of octadecyltrimethylammonium chloride is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;

(2) 11.7 g of the spherical iron phosphate obtained in step (1), 1.8 g of lithium hydroxide, 0.5 g of corn syrup, and 20 mL of polyethylene glycol are mixed and stirred, the mixture is further sent to a heating box for drying, and after heating in the filler Ar at 650° C. for 8 h, 12.3 g of spherical lithium iron phosphate is obtained; and (3) 0.15 g of ammonium sulfite, 12.3 g of the spherical lithium iron phosphate, and 20 mL of polyethylene glycol (containing 0.5 g of 1,6-bis(1H-imidazol-4-ylformyl)-hexane) are added to a reaction kettle and stirred, the mixture is aged at 120° C. for 8 h and further heated in the filler Ar at 450° C. for 4.5 h, and after crushing, washing, drying, and demagnetization, the ligand-coated lithium iron phosphate LiFePO$_4$@—C/N is obtained.

Comparative Example 2 (No Coating with Ligand)

The doped lithium iron phosphate of this comparative example has a chemical formula of LiFePO$_4$@Mn—Zn/Ga.

The specific steps of the preparation method for the doped lithium iron phosphate of this comparative example are as follows:
(1) 100 mL of 0.74 mol/L potassium dihydrogen phosphate and 76 mL of 0.53 mol/L ferric nitrate are dropwise added to a reaction kettle with a capacity of 500 mL and stirred, during which 20 mL of a solution containing 0.20 g of octadecyltrimethylammonium chloride is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate;
(2) 2.5 g of carbon nanospheres, 0.06 g of manganese sulfate, 0.06 g of zinc chloride, 0.04 g of gallium sulfate, 1.5 g of methacryloyl, and 9 mL of deionized water are uniformly mixed and stirred, and the mixture is centrifuged, filtered, and sent to a drying box for drying at 150° C. for 5 h to obtain 3.5 g of a manganese-zinc-gallium-based composite supported carbon microsphere conductor precursor;
(3) 3.3 g of the manganese-zinc-gallium-based composite supported carbon microsphere conductor precursor, 0.5 g of 1,6-bis(dimethylamino)hexane, and 7 mL of ethanol are uniformly mixed, and the mixture is sent to a drying box for a treatment in the filler Ar at 420° C. for 35 min to obtain 3.7 g of a carbon microsphere conductor; and
(4) 11.7 g of the spherical iron phosphate obtained in step (1), 0.1 g of the carbon microsphere conductor, 1.8 g of lithium hydroxide, 0.3 g of corn syrup, and 20 mL of polyethylene glycol are mixed and stirred, the mixture is further sent to a heating box for drying, and after heating in the filler Ar at 650° ° C. for 8 h, 12.3 g of the carbon-microsphere-conductor-doped spherical lithium iron phosphate LiFePO$_4$@Mn—Zn/Ga is obtained.

Comparative Example 3

The lithium iron phosphate of this comparative example has a general chemical formula of LiFePO$_4$.

The specific steps of the preparation method for the lithium iron phosphate of this comparative example are as follows:
(1) 100 mL of 0.74 mol/L ammonium dihydrogen phosphate and 73 mL of 0.50 mol/L ferric sulfate are dropwise added to a reaction kettle with a capacity of 500 mL and stirred, during which 20 mL of a solution containing 0.20 g of octadecyltrimethylammonium chloride is added dropwise, an appropriate amount of phosphoric acid is added to control the pH of the solution to be 2.3, the reaction kettle is sent to a heating box for heating in the filler Ar at 585° C. for 6 h, and after standing overnight, the product is filtered, washed, and dried to obtain 11.7 g of spherical iron phosphate; and
(2) 11.7 g of the spherical iron phosphate obtained in step (1), 1.8 g of lithium hydroxide, 0.5 g of corn syrup, and 20 mL of polyethylene glycol are mixed and stirred, the mixture is further sent to a heating box for drying, and after heating in the filler Ar at 650° C. for 8 h, 12.3 g of lithium iron phosphate is obtained.

Analysis of Embodiments 1-6 and Comparative Examples 1-3

The spherical lithium iron phosphate positive electrode materials of Embodiments 1-6 and Comparative Examples 1-3, a carbon black conductive agent, and PVDF are prepared into slurries at a mass ratio of 80:15:5, the slurries are then applied on copper foils to prepare electrode pieces, and the electrode pieces are placed in an oven and dried at 80° C. Sodium flakes are used as a counter electrode. 1.5 mol/L sodium hexafluorophosphate in propylene carbonate is used as an electrolyte solution, Celgard 2400 is used as a separator, and a battery is assembled in an argon atmosphere in a vacuum glove box. The cycle performance is tested using an electrochemical workstation. The tested current density is 15 mAh·g$^{-1}$, the charge-discharge range is 2.5-4.2 V, and the number of cycles is 1-50.

TABLE 1

Specific discharge capacities obtained from the positive electrode materials prepared in the examples and comparative examples

| Group | Specific discharge capacity (mAh/g) | | |
|---|---|---|---|
| | First | 10th | 50th |
| Embodiment 1 | 165 | 164 | 161 |
| Embodiment 2 | 166 | 163 | 159 |
| Embodiment 3 | 165 | 164 | 160 |
| Embodiment 4 | 164 | 163 | 159 |
| Embodiment 5 | 165 | 163 | 160 |
| Embodiment 6 | 165 | 163 | 157 |
| Comparative Embodiment 1 | 158 | 152 | 142 |
| Comparative Embodiment 2 | 159 | 149 | 142 |
| Comparative Example 3 | 158 | 148 | 143 |

TABLE 2

Specific surface areas, electrical conductivities, and D$_{50}$ of the positive electrode materials prepared in the examples and comparative examples

| Group | BET (m$^2$/g) | EC (S/cm) | D$_{50}$ (μm) |
|---|---|---|---|
| Embodiment 1 | 20.6 | 0.327 | 0.135 |
| Embodiment 2 | 21.4 | 0.316 | 0.137 |
| Embodiment 3 | 22.6 | 0.332 | 0.135 |
| Embodiment 4 | 21.3 | 0.326 | 0.141 |
| Embodiment 5 | 21.7 | 0.338 | 0.128 |
| Embodiment 6 | 21.8 | 0.314 | 0.133 |
| Comparative Example 1 | 17.6 | 0.278 | 0.148 |
| Comparative Example 2 | 16.0 | 0.269 | 0.146 |
| Comparative Example 3 | 14.9 | 0.247 | 0.138 |

Figure 4:
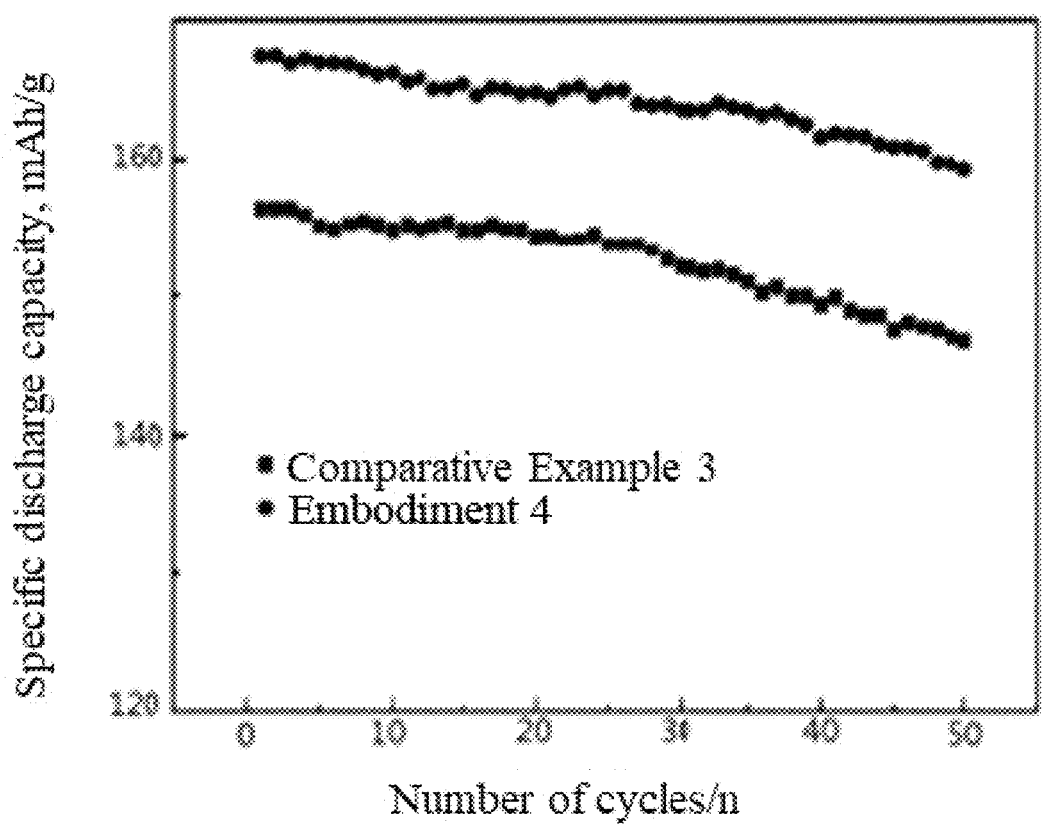
FIG. 4 is specific discharge capacity graphs of the ligand-coated doped lithium iron phosphates prepared in Embodiment 4 of the present invention and Comparative Embodiment 3 from the 1st to 50th discharges.

With reference to Tables 1 and 2 and FIG. 4, the first specific discharge capacities of Embodiments 1-6 reached 164-166 mAh/g, whereas the first specific discharge capacities of Comparative Examples 1-3 are 158-159 mAh/g; and when the number of cycles reached 50, the specific discharge capacities of Embodiments 1-6 reached 157-161 mAh/g, whereas the first specific discharge capacities of Comparative Examples 1-3 are 142-143 mAh/g. Embodiments 1-6 exhibited excellent rate and cycle performance. The specific surface areas and electrical conductivities of the spherical lithium iron phosphates prepared in Embodiments 1-6 are all higher than those of the spherical lithium iron phosphates prepared in Comparative Examples 1-3; in particular, the specific surface areas and electrical conductivities of the spherical lithium iron phosphates prepared in Comparative Examples 1 and 2 are higher than those of the spherical lithium iron phosphates prepared in Examples 1-3, indicating that the structure of the spherical lithium iron phosphate treated with the composite supported carbon microsphere conductor and coated with the liquid phase ligand is superior.

The embodiments of the present invention have been illustrated in detail above in conjunction with the accompanying drawings; however, the present invention is not limited to the above-mentioned embodiments, and within the scope of knowledge possessed by those of ordinary skill in the art, various changes may also be made without departing from the gist of the present invention. Furthermore, without conflict, the embodiments of the present invention and the features in these embodiments may be combined with each other.

The invention claimed is:

1. A preparation method for a ligand-coated doped lithium iron phosphate, wherein, a general formula of the ligand-coated doped lithium iron phosphate is LiFePO$_4$@Mn-T-C/N, and T is at least one of zinc, nickel, copper, iron, cobalt, zirconium, aluminum, gallium, or chromium; and the preparation method comprises the following steps:
mixing a phosphate fertilizer, an iron source, and a regulator, heating a resulting mixture for reaction, carrying out solid-liquid separation, and taking a solid phase for first calcination, to obtain iron phosphate;
mixing the iron phosphate with a lithium source, a carbon source, and a carbon microsphere conductor, stirring a resulting mixture, and subjecting the mixture to second calcination, to obtain carbon-microsphere-conductor-doped lithium iron phosphate; and
mixing the carbon-microsphere-conductor-doped lithium iron phosphate with a sulfite and a liquid phase ligand, stirring a resulting mixture, and subjecting the mixture to aging, cross-linking, and third calcination, to obtain the ligand-coated doped lithium iron phosphate,
wherein the carbon microsphere conductor comprises carbon nanospheres, 1,6-bis(dimethylamino)hexane, a manganese source, a T source, methacrylamide, and a dispersant; and the T source comprises at least one of soluble chloride salts, nitrates, or sulfates of zinc, nickel, copper, iron, cobalt, zirconium, aluminum, gallium, or chromium.

2. The preparation method of claim 1, wherein, the phosphate fertilizer is at least one of ammonium dihydrogen phosphate, diammonium hydrogen phosphate, ammonium phosphate, potassium dihydrogen phosphate, dipotassium hydrogen phosphate, potassium phosphate, or potassium phosphite; and the iron source is at least one of ferric chloride, ferric acetate, ferric nitrate, ferric sulfate, ferric hydroxide, or ferric oxalate.

3. The preparation method of claim 1, wherein, the regulator is at least one of octadecyltrimethylammonium bromide, cetyltrimethylammonium bromide, tetradecyltrimethylammonium bromide, or dodecyltrimethylammonium bromide; and the carbon source is at least one of maltose powder, corn syrup, bee honey, glucose powder, or starch.

4. The preparation method of claim 1, wherein, the liquid phase ligand is formed by mixing a ligand and a dispersant at a solid-to-liquid ratio of (0.1-0.5) g:(2-10) ml; and the ligand is at least one of 1,6-bis(1H-imidazol-4-carboxamido)-hexane, 1,2-bis(1H-imidazole-4-formamido) ethane, dimethyl 4-hydroxy-(1,1'-biphenyl)-3,5-diformate, or 1,1',1''-(nitrilotris(benzene-4,1-diacyl))triethanone.

5. The preparation method of claim 1, wherein, the T in the ligand-coated doped lithium iron phosphate is at least one of zinc, nickel, copper, cobalt, zirconium and gallium.

6. The preparation method of claim 1, wherein, the Mn-T-C/N in the ligand-coated doped lithium iron phosphate is Mn-T supported on C/N.

7. The preparation method of claim 1, wherein, the ligand-coated doped lithium iron phosphate is one of LiFePO$_4$@Mn—Zn/Ga—C/N, LiFePO$_4$@Mn—Cu/Co/Zr—C/N, LiFePO$_4$@Mn—Zn/Co—C/N, LiFePO$_4$@Mn—Co/Cu—C/N, LiFePO$_4$@Mn—Zr/Cu—C/N, LiFePO$_4$@Mn—Zr/Cu/Co—C/N, or LiFePO$_4$@Mn—Zn/Cu/Co—C/N.

* * * * *